United States Patent [19]

Dunn et al.

[11] Patent Number: 5,448,669
[45] Date of Patent: Sep. 5, 1995

[54] HYBRID COMMUNICATIONS CABLE FOR ENHANCEMENT OF TRANSMISSION CAPABILITY

[75] Inventors: Lawrence R. Dunn, Flowery Branch; Nathan E. Hardwick, III, Dunwoody, both of Ga.; David M. Mitchell, Scottsdale, Ariz.; Robert P. Mohalley, Dunwoody, Ga.; Peter A. Woog, Phoenix, Ariz.

[73] Assignee: AT&T Corp., Murray Hill, N.J.

[21] Appl. No.: 171,885

[22] Filed: Dec. 21, 1993

Related U.S. Application Data

[63] Continuation of Ser. No. 856,619, Mar. 24, 1992, abandoned.

[51] Int. Cl.⁶ .................................................. G02B 6/44
[52] U.S. Cl. ....................................... 385/101; 385/100; 174/117 R
[58] Field of Search ................... 385/100, 101, 102, 103, 385/107; 174/117 R, 117 F, 115, 17 R

[56] References Cited

U.S. PATENT DOCUMENTS

| | | | |
|---|---|---|---|
| 4,160,872 | 7/1979 | Lundberg et al. | 385/103 X |
| 4,365,865 | 12/1982 | Stiles | 350/96.23 |
| 4,392,714 | 7/1983 | Bruggendieck et al. | 350/96.23 |
| 4,416,508 | 11/1983 | Dey et al. | 350/96.23 |
| 4,552,432 | 11/1985 | Anderson et al. | 350/96.23 |
| 4,662,712 | 5/1987 | Tabata et al. | 385/102 |
| 4,671,611 | 6/1987 | Allemand et al. | 385/107 |
| 4,815,813 | 3/1989 | Arroyo et al. | 385/102 |
| 4,856,867 | 8/1989 | Gaylin | 385/102 X |
| 4,993,805 | 2/1991 | Abe et al. | 385/101 X |
| 5,039,195 | 8/1991 | Jenkins et al. | 350/96.23 |
| 5,125,062 | 6/1992 | Marlier et al. | 385/101 |
| 5,189,718 | 2/1993 | Barrett et al. | 385/100 X |

FOREIGN PATENT DOCUMENTS 3316898  5/1983  Germany .

*Primary Examiner*—Rodney B. Bovernick
*Assistant Examiner*—Phan T. H. Palmer
*Attorney, Agent, or Firm*—Donald E. Hayes, Jr.

[57] ABSTRACT

A hybrid cable (20) includes a first transmission portion such as a metallic conductor portion (22) and a second transmission portion such as an optical fiber portion (24). The metallic conductor portion includes a core which includes twisted pairs of metallic conductors enclosed in a plastic core wrap, a shielding system and a plastic jacket (48). A longitudinally extending duct (52) is disposed in engagement with an outer surface of the plastic jacket of the metallic conductor portion. An outer plastic jacket (60) is disposed about the duct and the metallic conductor portion. An optical fiber cable (50) or optical fibers (51, 51) may be caused to become disposed initially in the duct or when the use of fibers becomes economically justified.

21 Claims, 4 Drawing Sheets

HYBRID COMMUNICATIONS CABLE FOR ENHANCEMENT OF TRANSMISSION CAPABILITY

This application is a continuation of application Ser. No. 07/856619, filed Mar. 24, 1992 now abandoned.

TECHNICAL FIELD

This invention relates to a hybrid communications cable for enhancement of transmission capability. More particularly, this invention relates to a hybrid cable which may include optical as well as metallic conductor transmission media, which is easy to manufacture and the transmission media of which are easy to access.

BACKGROUND OF THE INVENTION

The use of optical fibers in communications has grown significantly over the past few years. It is anticipated that its use will reach into the residential loop distribution system in the near future. For now, loop distribution cables which include insulated metallic conductors continue to be installed.

Optical fiber has found widespread application in longhaul transmission such as, for example, between cities, and in trunk service, for example, between telephone central offices or switching centers. It is readily apparent that optical fiber can be used not only in longhaul and trunk applications but also in local area networks, service or drop applications, and in indoor cable. As a result, end to end optical communication is fast becoming a reality.

Nevertheless, operating telephone companies have expressed a desire to install cables which include metallic conductors as well as optical fiber capability. Notwithstanding the rapidly escalating use of optical fiber, there remains a need for metallic conductors such as copper conductors in order to modulate and demodulate digital or analog optical signals. Metallic conductors may be sought after to provide power or may be used for other low voltage signaling purposes. Furthermore, there may be a need for both optical fiber and metallic conductors at the same end use point. One such application may be at office workstations in a computerized facility. Another may be to provide addditional transmission media for metallic circuitry not yet fully utilized.

Such a need translates into a need of a hybrid cable which is intended to refer to a cable which offers the capability for both optical fiber and metallic transmission. A course of action of early placement of optical fiber capability along with metallic conductors in aerial or buried installations to customers' premises will facilitate the later transition from a metallic to an optical fiber operating system. By capability is meant the installation of facilities which at a later date facilitate the installation of optical fiber of a cost greatly reduced over that of a complete installation. Obviously, the first cost of installing optical fiber capability to customers' premises is minimized by such an approach because the capability of providing optical fiber transmission can be installed simultaneously with the installation of metallic transmission media for essentially the same cost as either separately. With such a cable, optical fiber or optical fiber capability can be provided to customers' premises awaiting the arrival of the optical fiber network and development of associated hardware and electronics.

Such cables initially having optical fiber capability may be placed by the same methods and apparatus as are used for all-copper cables. Accordingly, the optical fiber portion thereof must be robust enough to withstand plowing and trenching or aerial stringing of a host structure and to be capable of survival outside the host structure in a separate run to an optical fiber storage or termination point.

With such a cable structure in place, service will evolve from the metallic pairs to the optical fibers. Simple telephone service can begin immediately over a metallic pair of conductors. Other metallic conductor pairs of the distribution and service cable can serve as secondary lines or alarm circuits. Initially, the optical fiber unit may be used to provide cable television or be retained for later use.

At a later date, more sophisticated offerings such as, for example, electronic newspapers and mail, catalogs and shopping, banking and business activities and data and computer functions which require increased bandwidth and customer interaction provided by optical fiber transmission may be served through a remote terminal. For these applications, metallic conductor pairs may provide power to on-premise electronics or serve as control circuits. Still later, all offerings may be provided over the optical fiber media, but power still will have to be provided for on-site electronics by the power or telephone operating company. Providing power from a central office source through these structures should result in reliable telecommunications during power outages. Also, the copper conductor pairs may have other uses such as circuit maintenance, for example.

The sought-after cable should have desired properties. For example, it should have a relatively high tensile and compressive loading capability, a relatively low minimum bend radius, stiffness in order to insure that the optical fiber unit remains as straight as possible to minimize bend losses, an operating temperature range of about $-40°$ to $+160°$ F. and low cost. The cable should be able to withstand repeated impact during installation. Also, the structure must not be affected adversely by cable filling compounds. The cable must be water-resistant to prevent degradation of transmission or damage due to water-induced crack propagation or freezing. In those instances when it will connect to customers' premises, the cable must be capable of being made flame retardant. Also, the sought after cable should be relatively easy to manufacture and to connectorize despite the capability for different kinds of transmission media.

Hybrid cables are known to the prior art. For example, described in F. J. Mullin-W. S. Reed U.S. Pat. No. 4,852,965 which issued on Aug. 1, 1989 is a hybrid cable which includes a reinforced optical fiber unit. The unit includes an optical fiber or fibers enclosed by at least three impregnated fiberglass members and a jacket. The unit is included along with metallic conductors in a core tube enclosed in a plastic jacket.

Also important is access to the transmission media. In some prior art composite cables, optical fibers are disposed in a central portion thereof with copper conductors arranged thereabout. See, for example, U.S. Pat. No. 4,552,432. As a result, in order to access the optical fiber, a craftsperson needs to work through the copper conductors. Further, from a manufacturing standpoint, sometime conflicting sheath design constraints for copper and fiber technologies as well as the configuration required for various fiber and/or conductor counts increases greatly the cable complexity and cost.

In the alternative, an initially installed cable may include the metallic transmission media and a duct in which optical fibers are to be installed at a future date. When a duct for receiving optical fiber in the future is installed, the major port, ion of the construction is accomplished initially. At some future date, optical fiber is caused to be moved into the existing duct with minimum further construction activity.

Seemingly, the prior art is devoid of such a cable which provides both metallic and optical fiber capability along with desired properties such as the capability of easily accessing either the metallic conductors or the optical fiber or both. The sought-after cable will fill a need in the marketplace as services to the home are expanded.

SUMMARY OF THE INVENTION

The foregoing problems have been overcome by the hybrid cable of the invention. A hybrid cable of this invention includes a first transmission portion which includes a sheath system which includes a plastic jacket, and a second transmission portion. Means disposed about the first and the second transmission portions holds together the first and the second transmission portions. The second transmission portion includes a longitudinally extending duct which is made of a plastic material. In the preferred embodiment, the first transmission portion may be a metallic conductor portion which comprises a plurality of twisted pairs of insulated metallic conductors and a sheath system which includes a plastic jacket. Preferably, interstitial spaces within the core are filled and interfaces between sheath components of a metallic conductor portion are flooded with suitable waterblocking materials. The duct is disposed outside the jacket of the metallic conductor portion. In the preferred embodiment, an outer jacket is disposed about the metallic conductor portion and the duct.

The cable may be provided initially with optical fiber or optical fiber or optical fiber cable may be moved into the duct at a later date as the need for optical fiber capability arises. Cables of this invention have excellent mechanical properties. Waterblocking provisions also may be included either in the metallic conductor portion or in the optical fiber portion or in both. Further, when required, plastic materials used in the cables may be sufficiently flame retardant to permit the cables to extend onto customers' premises. The manufacturing flexibility of different fiber and conductor counts is a key feature because either of the as-shipped or planned media counts can be readily included without complicating the configuration of the other media portion.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
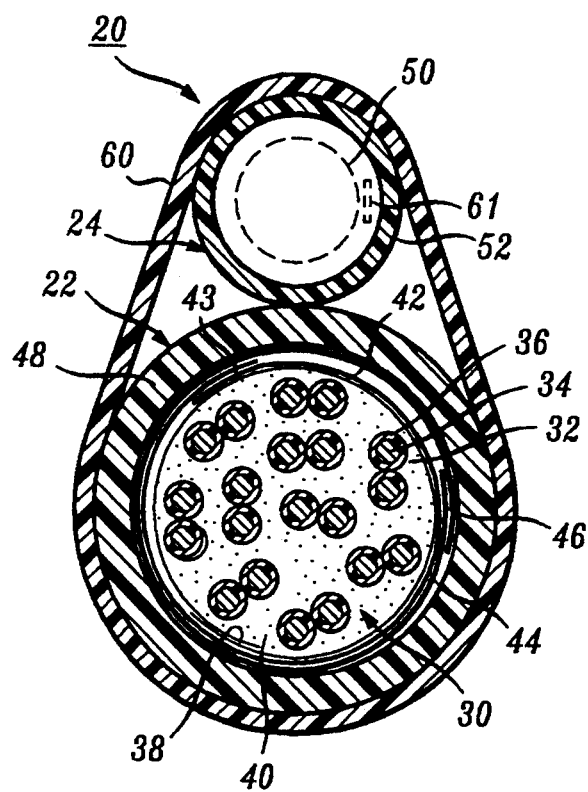
FIG. 1 is an end view of a hybrid communications cable.

Referring now to FIG. 1, there is shown a hybrid cable which is designated generally by the numeral 20. The cable 20 includes a first transmission portion 22 which in a preferred embodiment may be a metallic conductor portion and a second transmission portion which in a preferred embodiment may be an optical fiber portion 24.

The metallic conductor portion 22 includes a core 30 which includes a plurality of pairs of insulated metallic conductors 32—32. Each of the insulated metallic conductors includes a longitudinally extending metallic conductor 34 and an insulation cover 36. The insulation cover 36 may include one or more layers of insulation material such as one, for example, which is made of polyethylene. About the twisted pairs of metallic conductors is disposed a core wrap 38 which in a preferred embodiment is made of a plastic material such as polyester plastic material, for example.

It should be apparent that other materials may be used to provide the insulation covers 36—36. For example, should it be desired to extend the cable 20 onto customers' premises, the insulation cover desirably is a flame retardant material such as a polyetherimide or other nonhalogenated plastic material.

The metallic conductor portion 22 of the cable 20 may also include waterblocking provisions. Disposed within interstices among the conductor pairs and between the conductor pairs and the core wrap 38 is a filling material ,40 which is waterblocking. A suitable filling material 40 is one such as that disclosed and claimed in U.S. Pat. No. 4,870,117 which issued in Sep. 20, 1989, in the names of A. C. Levy and C. Tu.

About the wrapped core is disposed a shielding system which may comprise one or more corrugated metallic shields. For example, the cable 20 may include a corrugated aluminum shield 42 which has been wrapped about the core to form a longitudinal gapped seam 43 and a corrugated steel shield 44 which has been wrapped about the corrugated aluminum shield and which has a longitudinal overlapped seam 46. Of course, the seams may be offset circumferentially from each other.

Lastly, for the metallic conductor portion 22, a jacket 48 which is made of a plastic material such a polyethylene encloses the shielding system. Of course, other suitable materials such as polypropylene or nonhalogenated flame retardant materials may be used for the jacket 48.

The metallic conductor portion may include other waterblocking provisions. For example, a layer of a laminate which includes a superabsorbent material in powder form may be included in the sheath system. Further, yarn which has been treated with a superabsorbent material may be included in the sheath system or in the core. See, for example, U.S. Pat. No. 4,867,526 which issued in the name of C. J. Arroyo on Sep. 19, 1989 and U.S. Pat. No. 4,815,813 which issued on Mar.

28, 1989 in the names of C. J. Arroyo, H. P. Debban, Jr. and W. J. Paucke.

Figure 2:
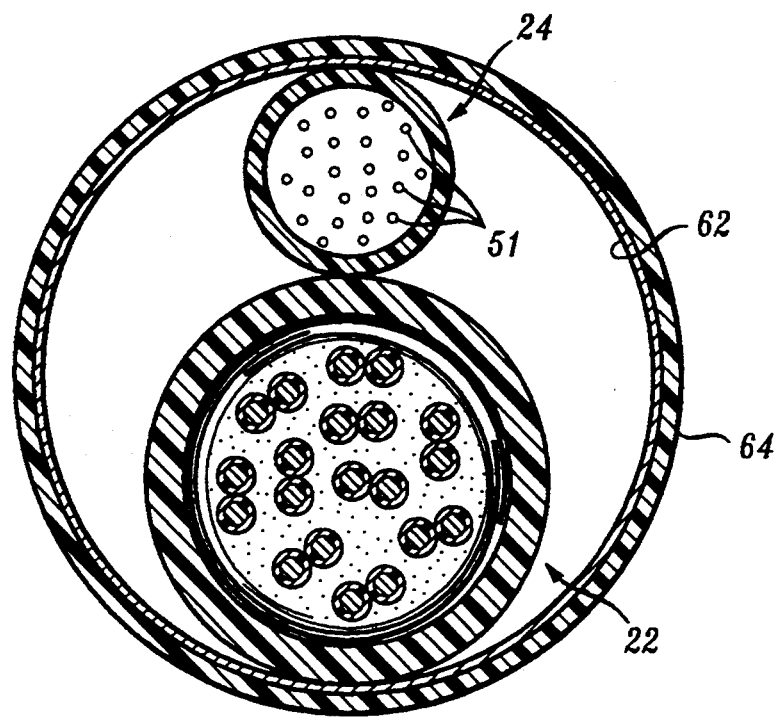
FIG. 2 is an end view of an alternative embodiment of a hybrid cable having a circular cross-section.

As is seen in FIG. 1, the optical fiber portion 24 of the cable 20 includes provisions for receiving optical fiber transmission media such as an optical fiber cable 50 which includes a plurality of optical fibers 51—51 (see FIG. 2). Such a cable 50 may be one such as that disclosed in U.S. Pat. No. 4,844,575 which issued on Jul. 4, 1989 in the names of M. D. Kinard, A. J. Panuska, M. R. Reynolds, M. R. Santana, and G. H. Webster. A longitudinally extending duct 52 is disposed outside the jacket 48 of the metallic conductor portion 22 and in a preferred embodiment is made of polyethylene. Other materials may be used for the duct 52. For example, if it is desired to extend the cable onto customers' premises, the duct may be made of a fluoropolymer or a non-halogenated material.

Instead of an optical fiber cable 50 loose optical fiber may be installed in the duct 52. In that event, the duct 52 is sized so that an inner area defined by the inner diameter of the duct is sufficiently large to maintain a suitable packing ratio of the optical fibers 51—51 which may become disposed in the duct. By packing ratio is meant the ratio of the sum of the transverse cross-sectional areas of the optical fibers to the inner area defined by the inner diameter of the duct. A suitable ratio is in the range of about 0.1 to 0.5.

Holding the metallic conductor portion 22 and the optical fiber portion 24 together is an outer jacket 60. The outer jacket 60 preferably is made of polyethylene, but for indoor uses may be a suitable flame retardant material. As is seen in FIG. 1, the outer jacket 60 engages a substantial portion of the circumference of the jacket 48 of the metallic conductor portion 22 and a portion of the duct 52.

Of course, when the cable 20 is manufactured, the cable may not include optical fiber. What it does include are provisions for receiving optical fiber at a later time as the use of optical fiber can be justified economically. At a subsequent time, optical fiber may be installed in the duct 52 by the use of a pre-placed pulling tape 61 or by using the flow of air. In the alternative, the fiber may be caused to become disposed in the duct 52 by the methods described and claimed in copending commonly assigned application Ser. No. 07/720,988 which was filed on Jun. 25, 1991 now U.S. Pat. No. 5,234,198 in the names of A. L. Hale, M. R. Santana and K. P. Wells.

The optical fiber portion 24 also may include waterblocking provisions. For example, if optical fibers are disposed in the duct 52 either during manufacture of the cable 20 or subsequently, the duct may be filled with a waterblocking material such as that, disclosed in application Ser. No. 07/691,770 filed on Apr. 26, 1991 U.S. Pat. No. 5,187,763, in the name of C. F. TU and which is incorporated by reference hereinto.

The cable 20 of this invention is advantageous from a number of standpoints. For example, accessing the optical fiber in the cable 20 is relatively easy; only the outer jacket 60 need be violated to reach the optical fiber portion 24. Further, because the duct 52 may be used to receive an optical fiber cable, any suitably sized cable may be used, depending on specific needs. Also, the metallic conductor portion 22 may be a standard offering multipair cable. Further, the configuration is adaptable to various size ducts and various copper conductor cable sizes. Accordingly, the cables of this invention facilitate the marriage of optical fiber and metallic conductor cables, each having properties to meet specific needs.

Although the configuration of the cable in FIG. 1 is non-circular, a circular arrangement is achievable. Instead of extruding the jacket 60 over the duct 52 and over the metallic conductor portion 22, the duct and the metallic conductor portions are enclosed in a circular metallic member 62 (see FIG. 2) which has been wrapped about the assembly of the duct and the metallic conductor portion. The metallic member 62 is provided with an adhesive material such as an adhesive copolymer material on its outer major surface. Then an outer jacket 64 is extruded about the circular metallic member and becomes adhered thereto.

Figure 3:
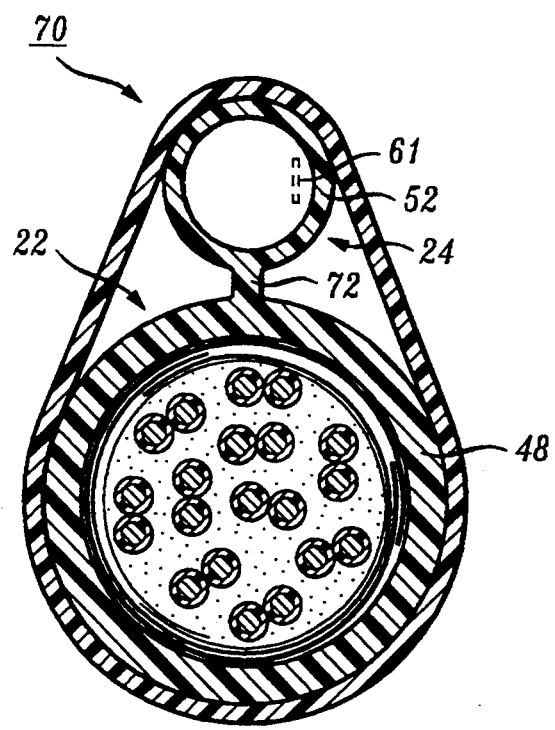
FIG. 3 is an alternative embodiment in which an optical fiber duct is spaced from a metallic conductor portion.

In the embodiments shown in FIGS. 1-2, the optical fiber portion 24 is contiguous to an outer surface of the metallic conductor portion 22. In an alternative embodiment shown in FIG. 3 and designated generally by the numeral 70, the optical fiber portion 24 is spaced from the jacket 48 of the metallic conductor portion 22 but connected thereto through a web 72 of a plastic material which is the same plastic material of which the duct 52 and the outer jacket 48 are made.

Figure 4:
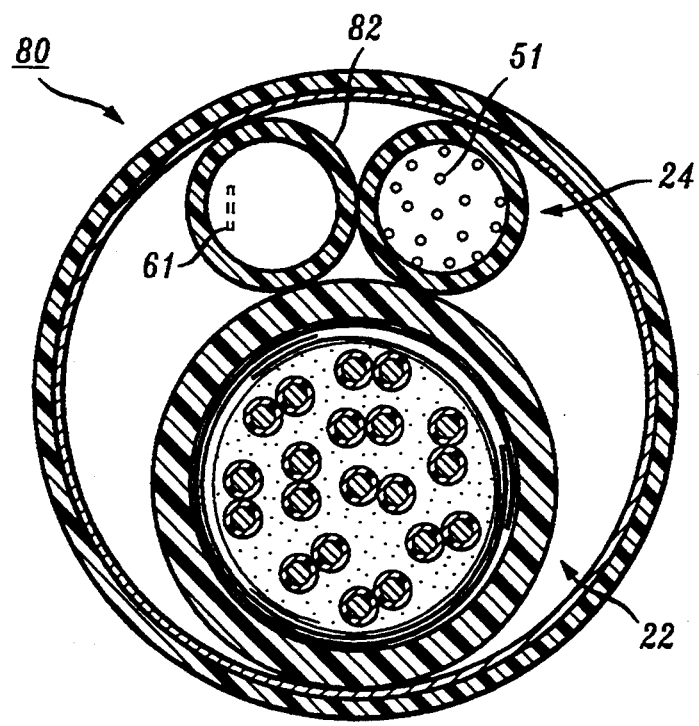
FIG. 4 is a still further embodiment which includes an optical fiber portion and a spare duct.

A still further embodiment is depicted in FIG. 4. Therein, a hybrid cable designated generally by the number 80 includes a metallic conductor portion 22, an optical fiber portion 24 and a spare duct 82. In this embodiment, the cable 80 may include optical fibers 51—51 or an optical fiber cable 50 disposed in the duct 52 whereas the spare duct 82 provides the capability of having additional fiber added thereto in the future.

The cable of this invention provides much flexibility in satisfying customers' needs. Reels of ducts and copper cables may be maintained in inventory in cable factories. As demand arises, a particular duct size may be joined to a particular copper cable size to customize the final product. A fixed size first transmission portion need not be attached permanently to a fixed size second transmission portion until a need is determined.

Optical fiber may be caused to become positioned in the duct in the factory or in the field when the need arises. When a future installation of optical fiber is planned, the duct of the cable is supplied with a pull tape therein.

Figure 5:
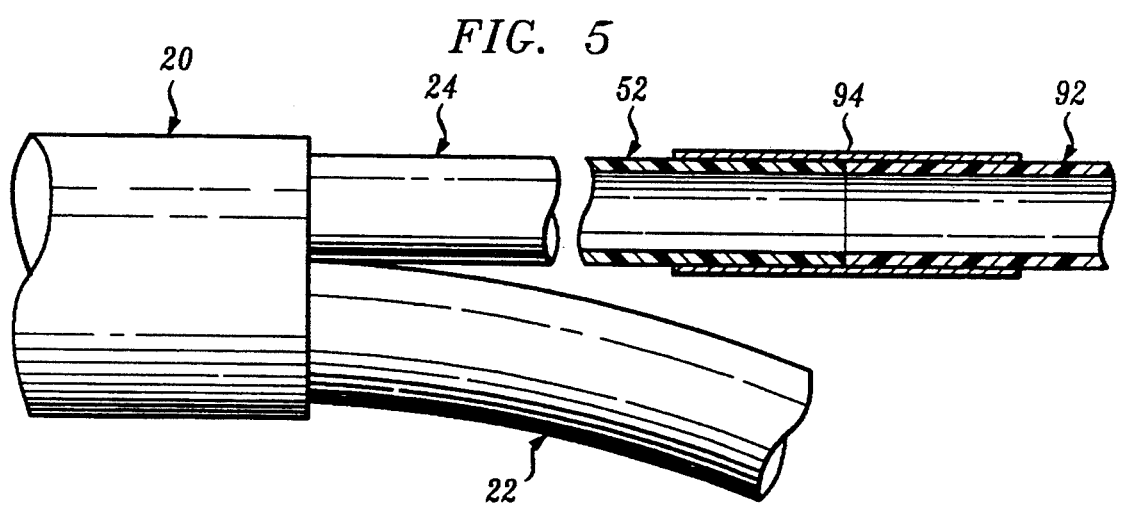
FIG. 5 is an elevational view of a hybrid communication cable in which an optical fiber portion has been extended after breakout of a metallic conductor portion.

Further, there is no requirement for the final installation that the copper cable portions and the duct be coextensive in length. After the copper cable portion 22 of a cable 20 is separated from the duct, the optical fiber portion 24 may be extended or routed separately by splicing a duct extension 92 (see FIG. 5) to the duct 52 with an alignment sleeve 94.

Figure 6:
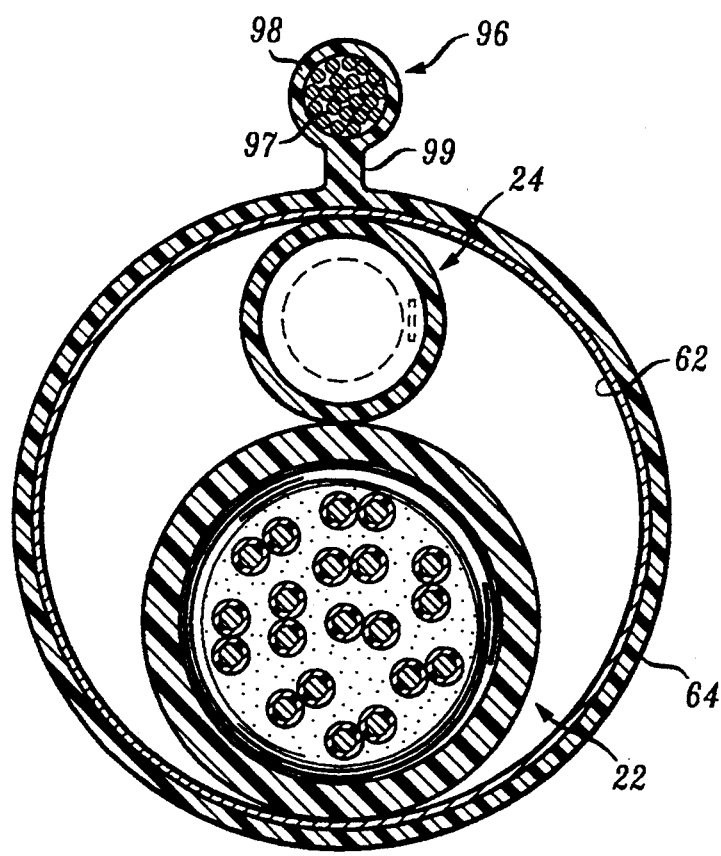
FIG. 6 is an end view of an alternative embodiment which includes a self-supporting sheath system and which is suitable for aerial use.

Cables of this invention also may be used aerially. For example, as is shown in FIG. 6, the cable of FIG. 2 may be provided with an aerial support portion 96. The aerial support portion 96 includes a longitudinally extending strength member 97 enclosed in a plastic jacket 98. The jacket 98 is connected to the plastic jacket 64 by a web 99 of plastic material.

Figure 7:
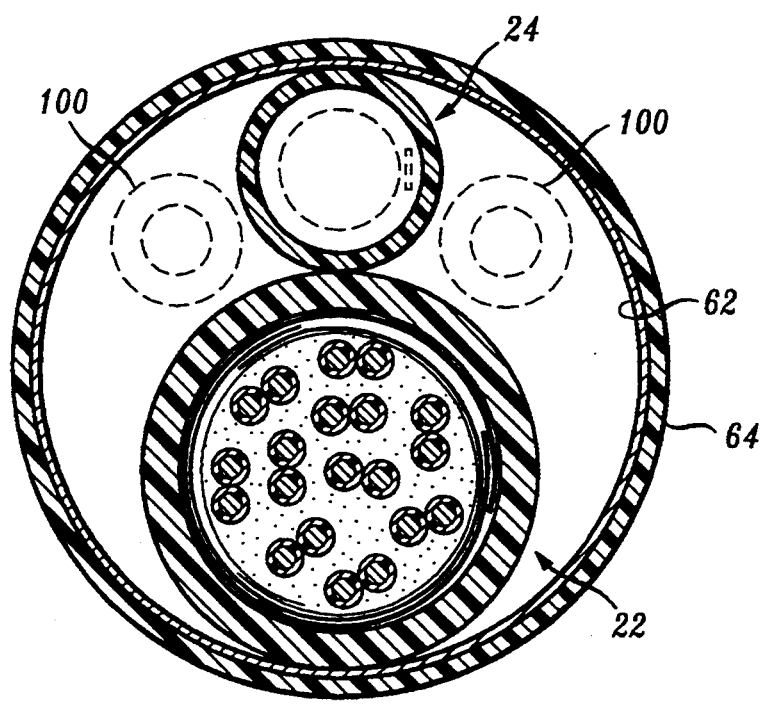
FIG. 7 is an end view of an alternative embodiment which includes metallic conductors which may be used for the transmission of electrical power.

Also, as mentioned in the Background of the Invention, a hybrid cable desirably includes metallic conductors which may be used to transmit electrical power for any number of purposes. In FIG. 7 is depicted the cable of FIG. 2 with two transmission media 100—100 which are suitable for the transmission of electrical power.

Cables of this invention are such as to be able to provide enhanced transmission capability to suit customers' needs. Further, various combinations of metallic conductor and/or optical fiber portions may be made. For example, in the configuration of FIG. 1, the first transmission portion need not be a metallic conductor portion but instead may be an optical fiber portion such as the optical fiber cable 50, for example. The second transmission portion affords the capability of enhancing the optical fiber capacity of the cable 20 at a future date as the need arises. Also, although the first transmission portion is depicted as having a larger outer diameter than that of the second transmission portion, the reverse may be true or they may be equal in size. Further, if the first transmission portion includes metallic conductors, the metallic conductors at a future date may be used for transmitting electrical power as optical fiber transmission media are added to the duct.

It is to be understood that the above-described arrangements are simply illustrative of the invention. Other arrangements may be devised by those skilled in the art which will embody the principles of the invention and fall within the spirit and scope thereof.

We claim:

1. A hybrid cable, which comprises:
   a first transmission portion which comprises a plurality of twisted pairs of metallic conductors and which is disposed within a sheath system;
   a second transmission portion which includes a duct which is adapted to receive an optical fiber transmission medium after the duct is formed and which is disposed outside said sheath system of said first transmission portion;
   waterblocking provisions which include a superabsorbent material within at least one of the transmission portion; and
   means for holding together said first and second transmission portions.

2. The hybrid cable of claim 1, wherein the holding means is an outer sheath system disposed about said first and second transmission portions.

3. The hybrid cable of claim 1, wherein said duct has an outer diameter which is less than the outer diameter of said metallic conductor portion.

4. The hybrid cable of claim 1, wherein said duct has an outer diameter which is greater than the outer diameter of said metallic conductor portion.

5. The hybrid cable of claim 1, wherein said metallic conductor portion includes a core wrap comprising a strip of plastic material which has been wrapped about said plurality of twisted pairs of insulated metallic conductors.

6. The hybrid cable of claim 5, wherein said metallic conductor portion also includes a shielding system which is disposed between said plastic jacket and said plurality of twisted pairs of insulated metallic conductors.

7. The hybrid cable of claim 1, wherein said duct is contiguous to an outer surface of said jacket of said metallic conductor portion.

8. The hybrid cable of claim 1, wherein said duct and said jacket of said metallic conductor portion are spaced apart and are joined by a plastic web extending therebetween.

9. The hybrid cable of claim 1, wherein said cable includes two ducts each of which is disposed outside said jacket of said first transmission portion and each being capable of having optical transmission media received therein, said means including an outer jacket enclosing said first transmission portion and said two ducts.

10. The hybrid cable of claim 9, which also includes a plurality of optical fibers which are disposed in one of said ducts.

11. The hybrid cable of claim 1, wherein said cable includes an optical fiber cable disposed in said duct and wherein said waterblocking provisions includes a filling material which is disposed in said optical fiber cable.

12. The hybrid cable of claim 1, wherein said waterblocking provisions includes a longitudinally extending tape which includes a superabsorbent material.

13. The hybrid cable of claim 1, wherein a longitudinally extending tape is disposed within said duct and is used to pull optical fiber or optical fiber cable into the duct.

14. The hybrid cable of claim 1, wherein said means includes an outer jacket, said hybrid cable also including an aerial support portion which includes a longitudinally extending strength member and a jacket which is disposed about said longitudinally extending strength member and which is connected to said outer jacket by a web which is made of plastic material.

15. The hybrid cable of claim 1, which also includes means for transmitting electrical power.

16. The hybrid cable of claim 1, wherein said means includes an outer jacket which has a circular cross section transverse of a longitudinal axis of said cable.

17. The hybrid cable of claim 16, wherein said cable includes a longitudinally extending metallic tube which is interposed between said duct and first transmission portion and said outer jacket and wherein an outer surface of said metallic tube is provided with an adhesive material which causes said outer jacket to be adhered to said metallic tube.

18. The hybrid cable of claim 1, which also includes optical fiber transmission media disposed in said duct.

19. The hybrid cable of claim 18, wherein the ratio of the transverse cross sectional areas of optical fiber which becomes disposed within said duct to a transverse cross sectional area defined by an inner surface of said duct is in the range of about 0.1 to 0.5.

20. The hybrid cable of claim 1, wherein the length of said duct and of said first transmission portion are unequal in a final installation.

21. The hybrid cable of claim 20, wherein said duct is coupled to an extension duct through an alignment sleeve.

* * * * *